(12) United States Patent
Karai

(10) Patent No.: US 10,578,243 B2
(45) Date of Patent: Mar. 3, 2020

(54) ANTI-TILT SPRING MECHANISM AND TENSION MOUNTING MECHANISM FOR A BALL AND SOCKET MOUNTING DEVICE

(71) Applicant: Csaba Karai, Zsambek (HU)

(72) Inventor: Csaba Karai, Zsambek (HU)

( * ) Notice: Subject to any disclaimer, the term of this patent is extended or adjusted under 35 U.S.C. 154(b) by 0 days.

(21) Appl. No.: 15/561,409

(22) PCT Filed: Mar. 25, 2016

(86) PCT No.: PCT/HU2016/000017
§ 371 (c)(1),
(2) Date: Sep. 25, 2017

(87) PCT Pub. No.: WO2016/156891
PCT Pub. Date: Oct. 6, 2016

(65) Prior Publication Data
US 2018/0106416 A1    Apr. 19, 2018

(30) Foreign Application Priority Data

Mar. 31, 2015   (HU) .................................... 1500134
Nov. 19, 2015   (HU) .................................... 1500550

(51) Int. Cl.
*F16M 11/14*          (2006.01)
(52) U.S. Cl.
CPC ......... *F16M 11/14* (2013.01); *F16M 2200/04* (2013.01); *F16M 2200/041* (2013.01)
(58) Field of Classification Search
USPC ..... 248/181.1, 181.2, 183.3; 403/56, 76, 77, 403/78, 90, 114, 122, 125, 129, 131, 132, 403/133, 138, 144
See application file for complete search history.

(56) References Cited

U.S. PATENT DOCUMENTS

| 1,780,283 | A | * | 11/1930 | Brunt | ..................... F22B 21/345 |
| | | | | | 122/235.11 |
| 1,962,548 | A | * | 6/1934 | Zerk | ..................... F16M 11/14 |
| | | | | | 248/181.1 |
| 2,136,035 | A | * | 11/1938 | Altemus | ..................... F41J 9/20 |
| | | | | | 124/8 |
| 3,212,740 | A | * | 10/1965 | Greenberg | ............. A01K 97/10 |
| | | | | | 248/514 |

(Continued)

*Primary Examiner* — Alfred J Wujciak
(74) *Attorney, Agent, or Firm* — Olson & Cepuritis, Ltd.

(57) ABSTRACT

The invention relates to an anti-tilt spring mechanism and tension mounting mechanism for a ball and socket mounting device (1), consisting of an outer ball shell (16) provided with a guide member (18) disposed in an outer housing (15); an inner ball (5) disposed in the outer ball shell (16) and having a neck portion (10), a slit (9) and a slide with bore (20); a socket (24), and a cap (17), with a mounting disc (2), provided with an adjustment screw (3), being attached to the neck portion (10) of the inner ball (5). The anti-tilt spring mechanism and tensioning mechanism are characterised in that one or more expediently configured elastic bodies inserted into the inner cavity (6) of the inner ball (5) are in contact with or attached to the guide member (18) of the outer ball shell (16) and the interior surface of the inner ball (5), such that the rotation of the inner ball (5) is counteracted by the torque produced by the force arising from the deformation of the elastic body effected by the rotation of the inner ball (5).

8 Claims, 18 Drawing Sheets

(56) References Cited

U.S. PATENT DOCUMENTS

| | | | | |
|---|---|---|---|---|
| 4,621,782 A * | 11/1986 | Carlson | ............... | F16M 11/10 248/183.3 |
| 4,955,568 A * | 9/1990 | O'Connor | ............... | F16M 11/10 248/183.3 |
| 4,986,688 A * | 1/1991 | Tuan | ............... | F16C 11/0661 403/127 |
| 5,072,907 A * | 12/1991 | Vogt | ............... | F16C 11/106 248/181.1 |
| 5,249,766 A * | 10/1993 | Vogt | ............... | F16C 11/106 248/181.1 |
| 5,567,939 A * | 10/1996 | Hong | ............... | F16M 11/14 250/338.1 |
| 2008/0265111 A1* | 10/2008 | Darrow | ............... | F16M 11/041 248/163.1 |
| 2011/0089296 A1* | 4/2011 | Joanisse | ............... | F16M 11/14 248/181.1 |

* cited by examiner

ANTI-TILT SPRING MECHANISM AND TENSION MOUNTING MECHANISM FOR A BALL AND SOCKET MOUNTING DEVICE

CROSS-REFERENCE TO RELATED APPLICATIONS

This application is a U.S. National Stage of PCT/HU2016/000017, filed Mar. 25, 2016, which claims priority of Hungarian Patent Application No. P1500550, filed Nov. 19, 2015, and Hungarian Patent Application No. P1500134, filed Mar. 31, 2015, each of which is incorporated herein by reference.

TECHNICAL FIELD

The invention relates to an anti-tilt spring mechanism and tension mounting mechanism for a ball and socket mounting device, which spring mechanism allows for counterbalancing the tilting force resulting from the weight of the inner ball and the body (by way of example, camera) connected thereto when the inner ball of the ball and socket mounting device is displaced from balance as it is rotated in the vertical plane, and also provides for fixing the inner ball in a given position in such a manner that the optical axis of the body connected to the ball and socket mounting device is not rotated even to the slightest extent during and as a result of the fixing operation.

BACKGROUND ART

A basic requirement of photography is that the camera always has to be kept level.

Levellable ball and socket heads have been well known to photographers for a long time. As opposed to conventional ball and socket heads that have three degrees of freedom, here two balls are mounted inside each other. The outer, larger ball is adapted for levelling the system, while the inner, smaller one is restricted to two degrees of freedom, thereby functioning as a bidirectional tilting head, which is the most frequently applied camera mounting and orienting solution in photography and videography.

This conventional solution has the drawback that, when the camera is tilted forward or backward from its centre position, its centre of gravity is displaced from above the centre of the ball, and is thereby displaced from its balance position and becomes tilted forward. To prevent that from happening, the user must pay constant attention.

The prior art patent application P 01 03299 discloses a ball and socket joint and embedding ring wherein the embedding ring receives a spherical body, and wherein the joint comprises a housing encompassing the embedding ring, with the embedding ring completely encompassing the spherical body along a section adjacent a great circle thereof. The embedding ring has a first inner rim and a second inner, each of the rims defining a respective surface dimensioned differently from the other one.

The patent application P 13 00365 discloses a ball and socket mounting device for equipment requiring to be levelled and rotated, particularly for mounting cameras on tripods. The solution comprises a housing, open at the top, having an inner spherical surface, a shell, open at the top, adapted for being rotated in the housing and having an outer spherical surface region corresponding in shape to the inner spherical surface of the housing, and a ball having a surface shape corresponding to the inner spherical surface of the shell and adapted to be rotatable with respect to the shell. A mounting disc, extending through the upper opening of the housing and either joined to or made integral with the ball, is connected to the ball. The essential feature of this solution is that the shell is a spherical shell with a centre angle greater than 180°, preferably 190°-210° that is open at the top, where the shell is covered at the top by a flat surface, and where the ball is arranged to be secured to the shell.

The above described solutions have the disadvantages that they do not prevent the body (camera) mounted on the ball and socket mounting device from tilting downward when the mounting device is displaced from its balance position, and, due to the application of the fastening mechanism the optical axis is slightly displaced during fixing the position of the inner ball, and furthermore, due to its configuration, the slit formed in the inner ball structurally weakens the neck portion of the inner ball, and thus decreases the stability of the mounting.

The disadvantages of the solution according to the patent application P1300365 are explained with the help of FIG. 20.

In the known solution a slit opening towards the mounting disc $2a$ is formed in the inner ball 5, which results in that only one of the halves of the neck portion of the inner ball 5—the neck portion $10a$—is secured to the mounting disc $2a$, which causes the optical axis to get displaced with respect to the adjusted plane. Thereby the precision adjustment of the optical system becomes unfeasible.

In addition to that, the camera 4 mounted on the mounting disc $2a$ cannot be kept balanced, and thereby the camera 4 becomes tilted with respect to the horizontal plane at an angle $\Omega$.

DISCLOSURE OF INVENTION

The object of the present invention has been to provide a mechanism for preventing a body, by way of example, a camera, attached to the inner ball shell of a ball and socket mounting device from tilting during the adjustment of the inner ball of the ball and socket mounting device in a vertical plane, and also to provide for fixing the inner ball in a given position/orientation in such a manner that the optical axis of the body attached to the ball and socket mounting device does not get rotated by even the slightest amount during the fixing process resulting from the operation of the retaining mechanism.

Contemplating the solution according to the invention we have recognised that in case one of the faces of one or more expediently configured elastic body inserted into the inner cavity of the inner ball of a ball and socket mounting device is secured to a guide member of the outer ball shell, while another face of the one or more elastic body is either in contact with or is secured to the interior surface of the inner ball situated about a horizontal axis, in a manner that the force generated by the deformation of the elastic body resulting from rotation of the inner ball counteracts the rotation of the inner body, and, furthermore, in case a torsion spring is placed into an inner cavity formed in the inner ball of the ball and socket mounting device such that one of the stems of the spring is retained in a bore formed in a guide member arranged at the bottom of the outer ball shell, the other stem of the spring being retained in a bore formed in the neck arrangement of the inner ball of the ball and socket mounting device, with a pair V springs or flat springs being placed in the inner cavity formed in the inner ball in such a manner that the first stems of the springs are tensioned against a guide member formed at the bottom of the outer ball shell, while the second stems of the springs are tensioned against a support face formed inside the inner cavity, and with a tensioning bore and a slit, starting, respectively, from the upper neck portion of the inner ball and the bottom of the ball, being arranged in the inner ball, such that the slit encompasses the axis of the tensioning bore, the object of the invention can be achieved.

The object of the invention is achieved by providing an anti-tilt spring mechanism and tension mounting mechanism consisting of an outer ball shell provided with a guide member disposed in an outer housing; an inner ball having a neck portion disposed in the outer ball shell and having a slit and a slide with bore; a socket, and a cap, with a mounting disc, provided with an adjustment screw, being attached to the neck portion of the inner ball. The mechanism is characterised in that one or more expediently configured elastic bodies inserted into the inner cavity of the inner ball are in contact with or attached to the guide member of the outer ball shell and the interior surface of the inner ball, such that the rotation of the inner ball is counteracted by the torque produced by the force arising from the deformation of the elastic body effected by the rotation of the inner ball.

The object of the invention is further achieved by providing an anti-tilt spring mechanism and tension mounting mechanism consisting of an outer ball shell provided with a guide member disposed in an outer housing; an inner ball having a neck portion disposed in the outer ball shell and having a slit and a slide with bore; a socket, and a cap, with a mounting disc, provided with an adjustment screw, being attached to the neck portion of the inner ball. The mechanism is characterised in that the inner ball, situated in an outer ball shell inserted into the outer housing and provided with a guide member comprising a bore, and having an inner cavity, a neck portion with a bore, and with a slide with bore disposed on the mounting faces of the longitudinal cavity thereof, is positioned in such a manner that the bore of the slide with bore is attached to the guide member of the outer ball shell, with a dual stem torsion spring being mounted inside the inner cavity of the inner ball such that the first stem of the dual stem spring is secured in the bore of the guide member, and second stem thereof is secured in a bore formed in the neck portion, the spring force of the dual stem torsion spring thereby counterbalancing the tilting force produced by the weight of the body situated on the mounting disc secured to the inner ball, and with a slit, starting at the bottom portion of the inner ball and extending as far as the beginning of the neck portion of the inner ball, being formed in the inner ball, the slit dividing the inner ball into two spatial regions, a larger ball section and a smaller ball section, and with a tensioning bore with a diameter D and an axis t1, extending from the neck portion near the bottom of the inner ball, being formed such that the axis t1 of the tensioning bore is extends along the slit, with a tensioning bar being inserted into the tensioning bore in such a manner that the upper arcuate face of the tensioning bar comes into contact with the stem of the adjustment screw.

The object of the invention is still further achieved by providing an anti-tilt spring mechanism and tension mounting mechanism consisting of an outer ball shell provided with a guide member disposed in an outer housing; an inner ball having a neck portion disposed in the outer ball shell and having a slit and a slide with bore; a socket, and a cap, with a mounting disc, provided with an adjustment screw, being attached to the neck portion of the inner ball. The mechanism is characterised in that the inner ball, situated in the outer ball shell inserted into the outer housing and provided with a guide member, and having an inner cavity comprising a support face, a neck portion with a bore, and with a slide with bore disposed on the mounting faces of the longitudinal cavity thereof, is positioned in such a manner that the bore of the slide with bore is attached to the guide member of the outer ball shell, with two tensioning springs being inserted into the inner cavity of the inner ball such that the first stems thereof are tensioned against the guide member, the guide member and the stems being encompassed by a securing member, while the second stems of the tensioning springs are secured against support faces provided in the inner cavity of the inner ball, the tensioning springs thereby counterbalancing the tilting force resulting from the weight of the body mounted on the mounting disc secured to the inner ball, and with a slit, starting at the bottom portion of the inner ball and extending as far as the beginning of the neck portion of the inner ball, being formed in the inner ball, the slit dividing the inner ball into two spatial regions, a larger ball section and a smaller ball section, and with a tensioning bore with a diameter D and an axis t1, extending from the neck portion near the bottom of the inner ball, being formed such that the axis t1 of the tensioning bore is extends along the slit, with a tensioning bar being inserted into the tensioning bore in such a manner that the upper arcuate face of the tensioning bar comes into contact with the stem of the adjustment screw.

In a preferred embodiment the anti-tilt mechanism according to the invention the spring is a flat spring arranged to have stems.

In a further preferred and expedient embodiment of the anti-tilt mechanism according to the invention the tensioning bar having a length L consists of a cylindrical portion having a length L2 and a diameter D, and a truncated portion having a length L2, with a positioning pin being disposed on the cylindrical portion, and with the truncated portion having a tensioning face, two truncated surfaces set perpendicular to the tensioning face, and an arcuate face, where L1:L2=4:1-L1:L2=3:1.

In a further preferred and expedient embodiment of the anti-tilt mechanism according to the invention the inequality L>H holds for the tensioning bore having a length H and the tensioning bar having a length L.

In a further preferred and expedient embodiment of the anti-tilt mechanism according to the invention weight reduction recesses are formed in the inner ball.

In a further preferred and expedient embodiment of the anti-tilt mechanism according to the invention the axis (t1) of the tensioning bore lies inside the slit along the lower ⅓-¼ of the length thereof.

BRIEF DESCRIPTION OF THE DRAWINGS

The solution according to the invention is explained in detail referring to the attached drawings, where.

BEST MODE FOR CARRYING OUT THE INVENTION

Figure 1:
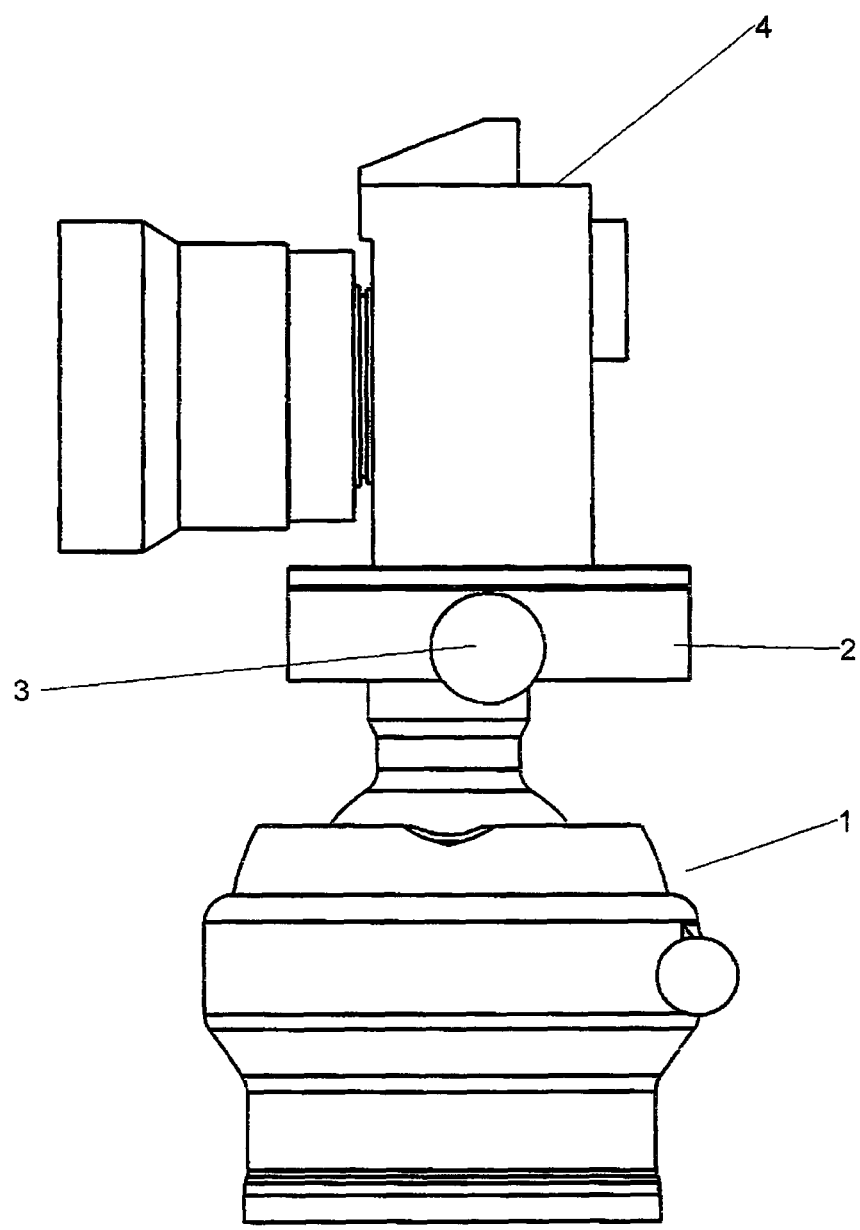
FIG. 1 is the side elevation view of a preferred embodiment of the ball and socket mounting device together with a camera mounted on it.

FIG. 1 illustrates a preferred realization of the ball and socket mounting device 1, showing a side elevation view together with a camera 4 mounted thereon. In the drawing there is shown the ball and socket mounting device 1 with the mounting disc 2 comprising an adjustment screw 3, as well as a camera 4 mounted thereon.

Figure 1A:
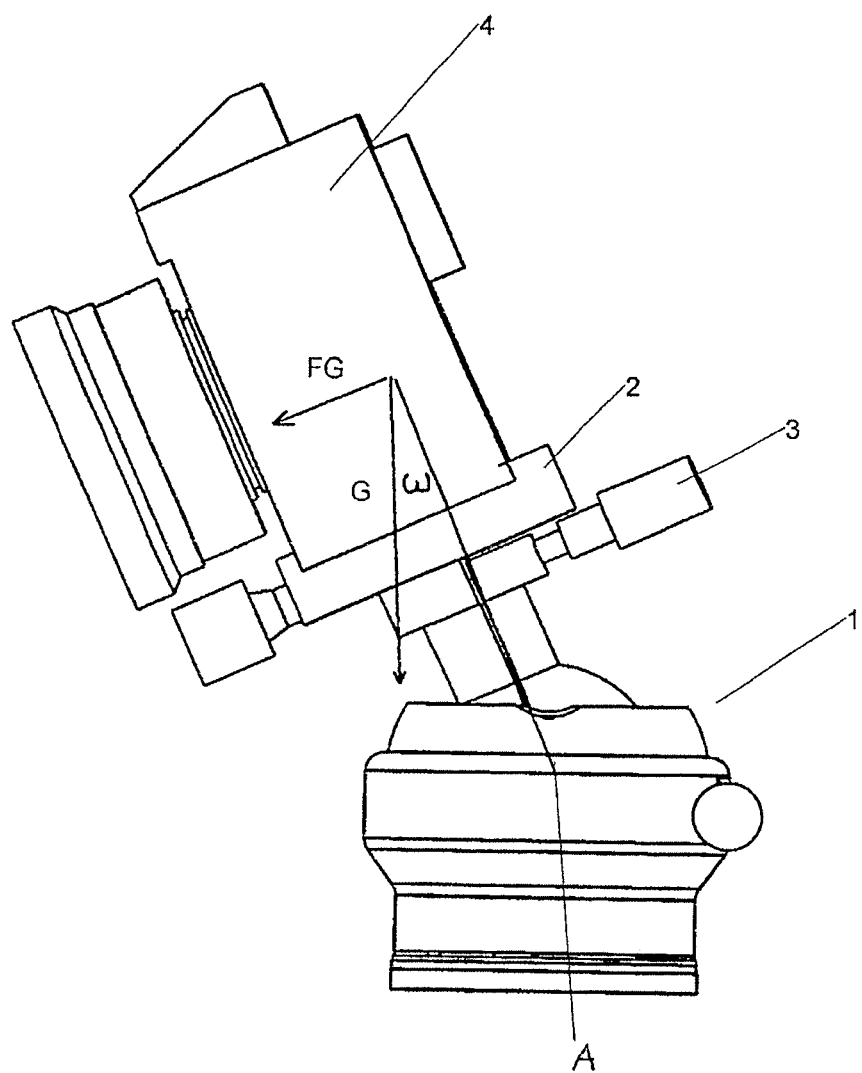
FIG. 1a illustrates the ball and socket mounting device shown in FIG. 1 in a tilted position.

In FIG. 1a the ball and socket mounting device is shown in a tilted position.

The camera 4 is positioned on the mounting disc 2 such that its centre of gravity G is above the pivot point A when the optical axis is set horizontally, and thereby the system is in a balanced position.

When the camera 4 is tilted by a given angle ω, a tilting force FG is produced:

$$FG = 6 \times \sin \omega$$

which tilting force is nearly directly proportional to the angle ω.

Although the system can be retained in any position applying the ball tensioning mechanism, for higher tilt angles ω such high retaining forces are required which make it impossible to turn the mounted device.

For low tilt angles ω the system is kept in balance by internal friction forces, but for higher tilt angles a spring force increasing in proportion to the tilt angle would be desirable in order to counterbalance the tilting force FG.

Such mode of operation is required wherein the body could be easily turned in any direction and could be retained in its last position.

The internal friction of the system can be adjusted by the adequate dimensioning of sliding components.

EXAMPLE

When the body is tilted to its maximum tilt, the angle ω=32°.

The internal friction of the system allows that equipment having a mass of approximately 1 kg can be kept stationary in any position. Practical experience indicates that in this case the system can be handled comfortably enough even for making fine adjustments. Such a spring should be selected which provides a spring force that is sufficient for counter-balancing a 2 kg optical device at the maximum tilt angle (32°), calculating with zero internal friction.

Thereby, the tilting of the device is counteracted by the combined internal frictional forces and the spring force.

However, internal friction also counteracts the return spring force, and thus, with a device having a mass between 1 kg and 3 kg (a range covering most cameras in general use) the device can retain its position/orientation in any position, and yet it can be turned easily, thereby allowing for comfortable and safe use.

The spring configurations mentioned in the example above will be explained in detail later on.

Figure 2:
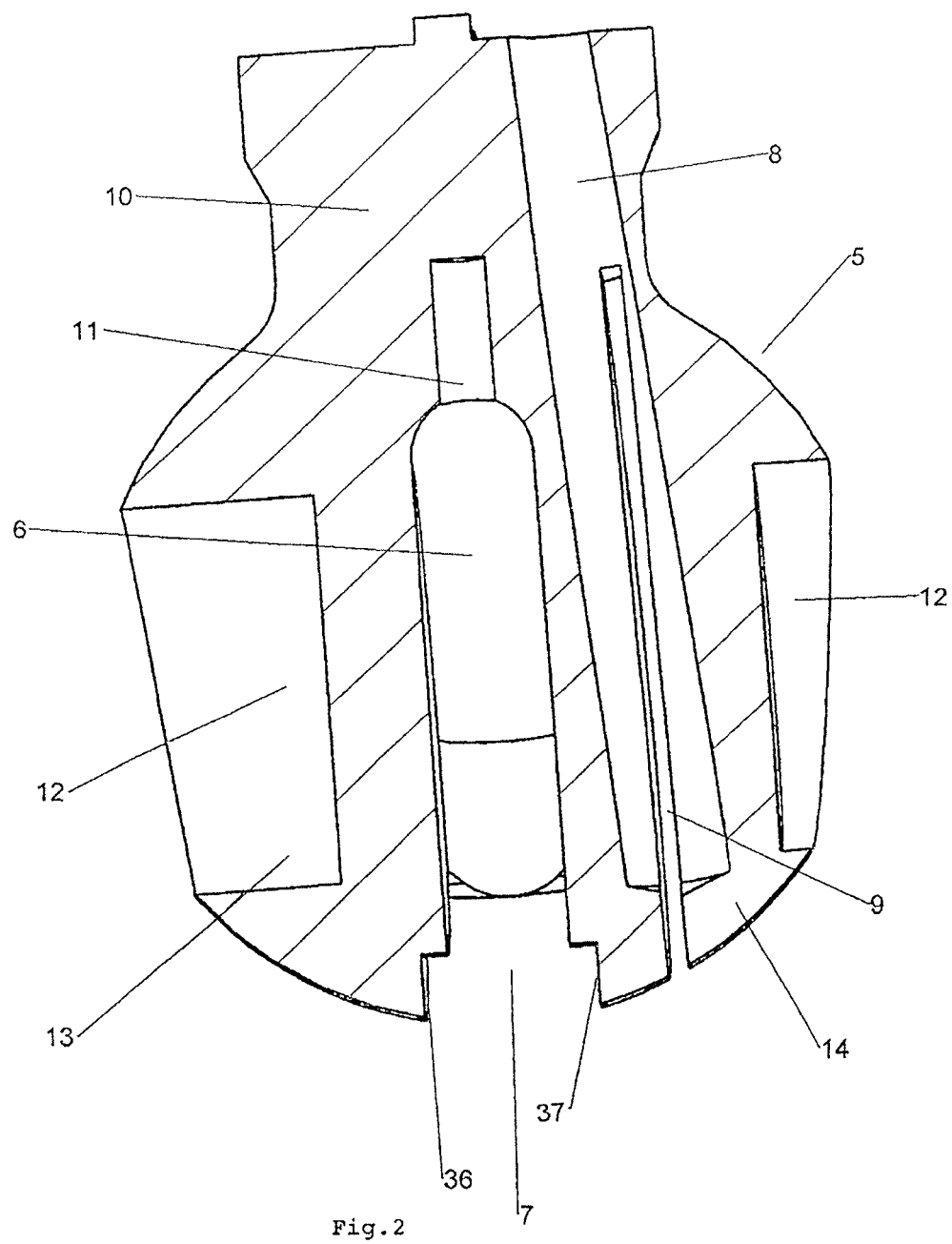
FIG. 2 is a sectional view of a preferred implementation of the inner ball of the tension mounting device according to the invention.
Figure 3:
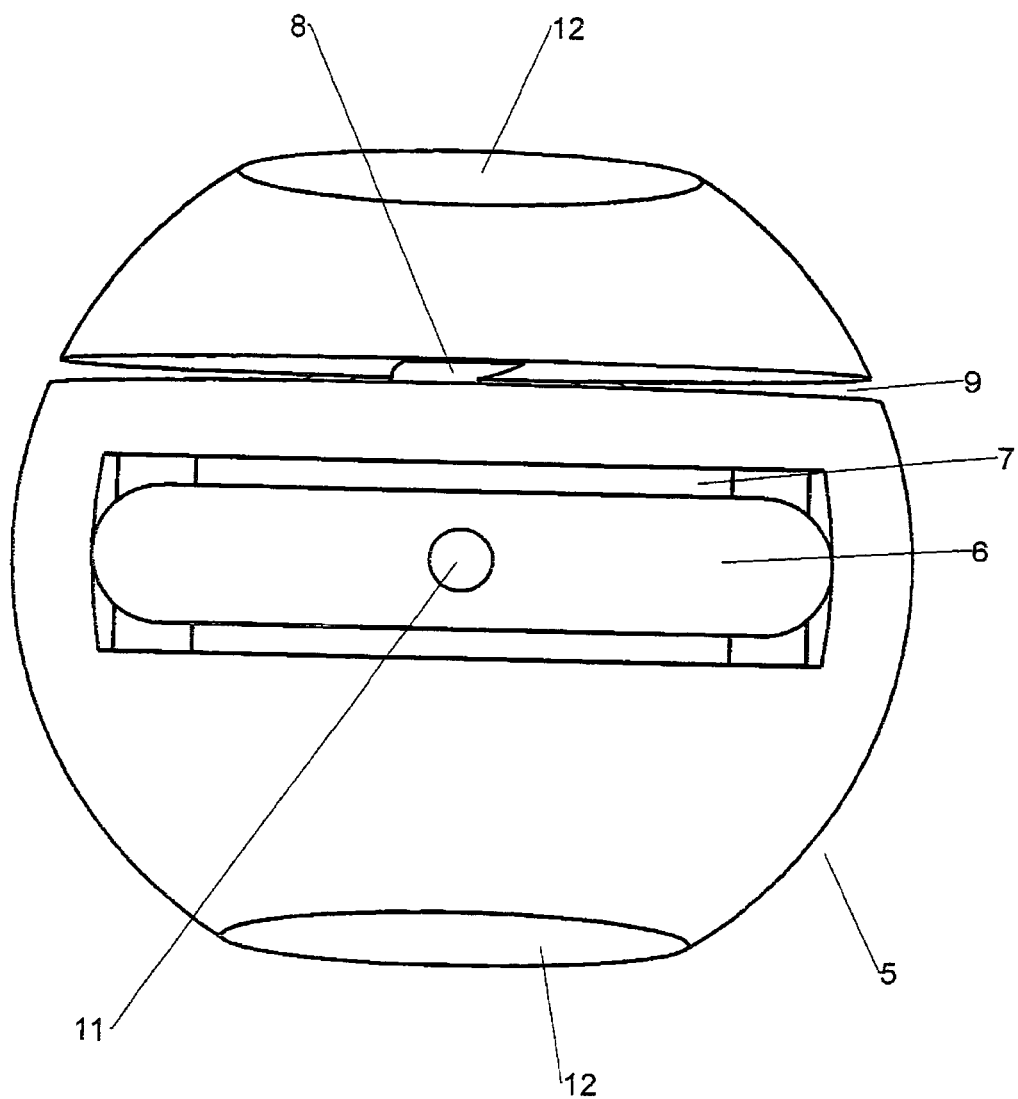
FIG. 3 is an underside view of the inner ball shown in FIG. 2.

FIG. 2 illustrates a possible embodiment of the inner ball 5 in sectional view, while FIG. 3 shows the underside view of the inner ball 5 of FIG. 2.

In the drawings there can easily be seen the inner ball 5, having a neck portion 10 and recesses 12, with an inner cavity 6 and longitudinal cavity 7 formed in the inner ball 5, and with a bore 11 disposed in the neck portion 10.

In the drawings there can also be seen a slit 9 and a tensioning bore 8. The slit 9 divides the inner ball 5 into two parts, a larger ball section 13 and a smaller ball section 14.

The slit 9 encompasses the axis t1 of the tensioning bore 8. This means that the middle plane of the slit 9 either coincides with the axis t1 of the tensioning bore 8 or expediently the axis t1 and the middle plane of the slit 9 intersect each other at an angle of a few degrees. This latter arrangement is aimed at bringing the upper portion of the slit 9, situated in the neck portion 10 of the inner ball 5, as close as possible to the outer face of the neck portion 10, i.e. to achieve that this part of the ball section is as narrow as possible at the neck portion 10, since this arrangement allows that the smaller ball section 14 can be distanced from the larger ball section 13 more easily, applying a lower force.

In the drawings there can also be seen the mounting faces 36, 37 of the longitudinal cavity 7.

Figure 4:
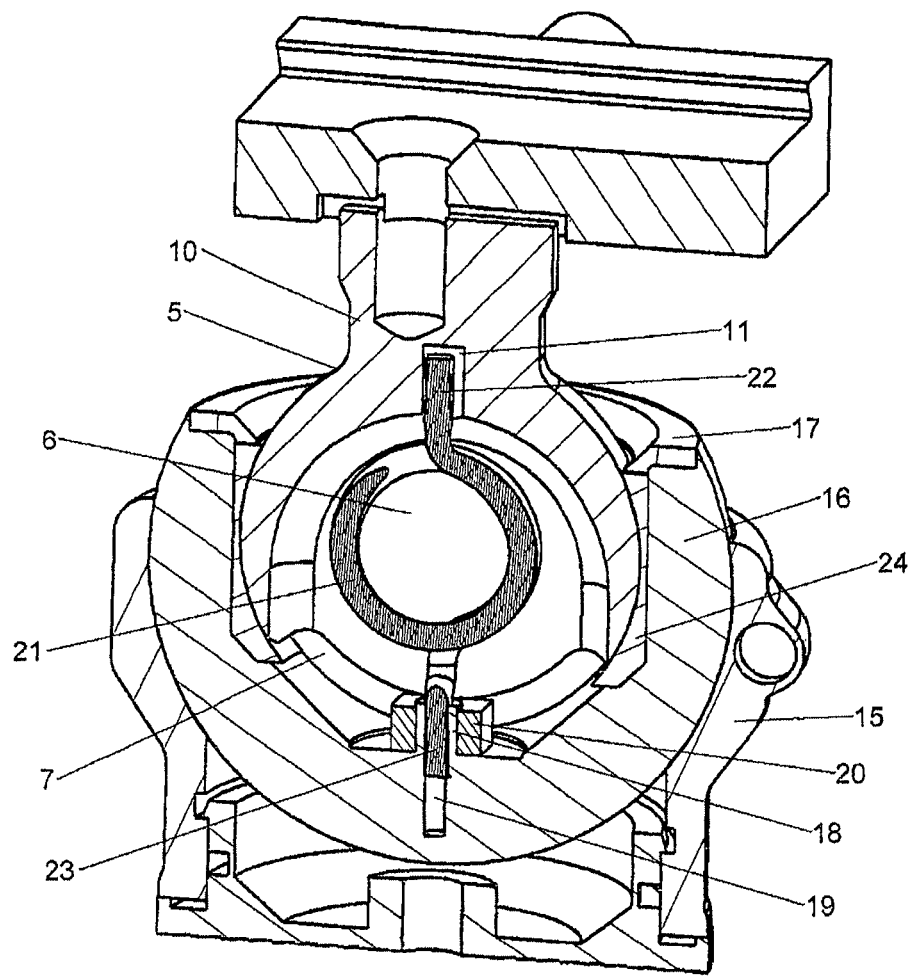
FIG. 4 is a sectional view of a preferred embodiment of the spring mechanism according to the invention.

FIG. 4 is a sectional view illustrating a preferred embodiment of the spring mechanism according to the invention. The drawing shows the outer housing 15 of the ball and socket mounting device 1, with the outer ball shell 16, provided with a guide member 18, being situated therein, and also shows the inner ball 5 inserted the outer ball shell 16, a socket 24 encompassing the inner ball 5, and the cap 17 adapted for covering the top of the outer ball shell 16. As can be seen in the drawing, a slide with bore 20 is placed on the guide member 18 by its bore (the diameter of the bore of the slide with bore 20 being the same as the diameter of the guide member 18), the slide with bore 20 being adapted for sliding along the mounting faces 36, 37 of the longitudinal cavity 7 formed inside the inner ball 5.

It is also seen in the drawing that the stem 23 of a dual stem spring 21 disposed in the inner cavity 6 is secured in a bore 19 formed in the guide member 18, while the other stem 22 of the dual stem spring 21 is secured in the bore 11 formed in the neck portion 10 of the inner ball 5.

The depth of the bore 19 formed in the guide member 18, adapted for receiving the stem 23 of the dual stem spring 21, is expediently larger than the length of the guide member 18, and thereby the bore 19 also extends into the outer ball shell 16. The mounting disc 2 is attached to the neck portion 10 of the inner ball 5.

Figure 5:
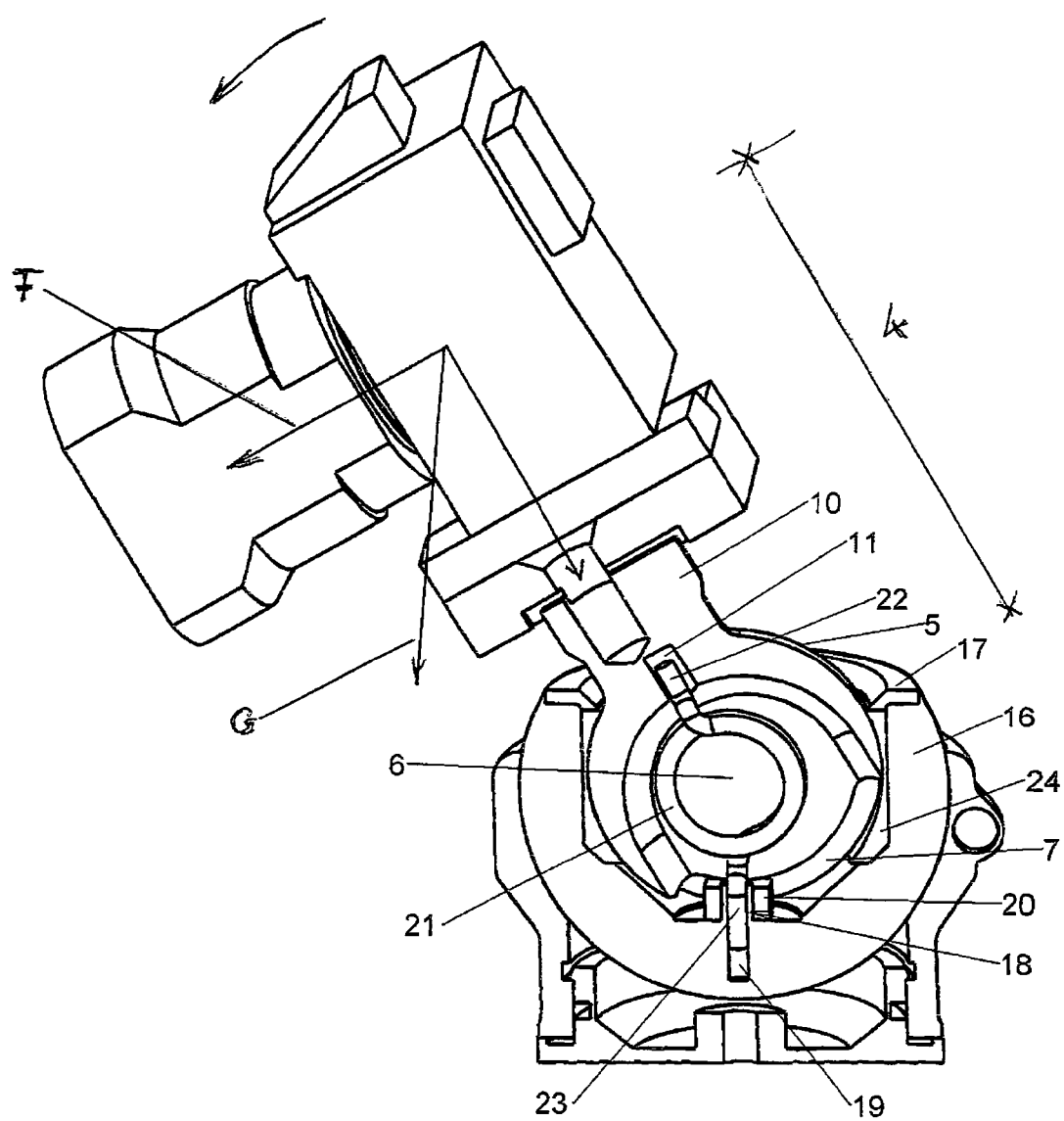
FIG. 5 is a partial sectional view of the camera mounted on the ball and socket mounting device of FIG. 4 in a slightly forward-tilted position.

FIG. 5 shows a partial sectional view of a camera 4 mounted on the ball and socket mounting device in a slightly forward tilted position, and the ball and socket mounting device 1 itself, with the mounting disc 2 that is provided with an adjustment screw 3.

When the user adjusts the inner ball 5, tilting the camera 4 forward in the direction indicated by the arrow, the spring force of the dual stem torsion spring 21 situated in the inner cavity 6 of the inner ball 5 counteracts further tilting, i.e. it counterbalances the torque (with respect of the axis of rotation) of the force component F perpendicular to the lever arm K resulting from the weight G of the camera 4.

It is therefore important to take into account the mass of the cameras 4 also for specifying the spring force of the dual stem spring 21.

Figure 6:
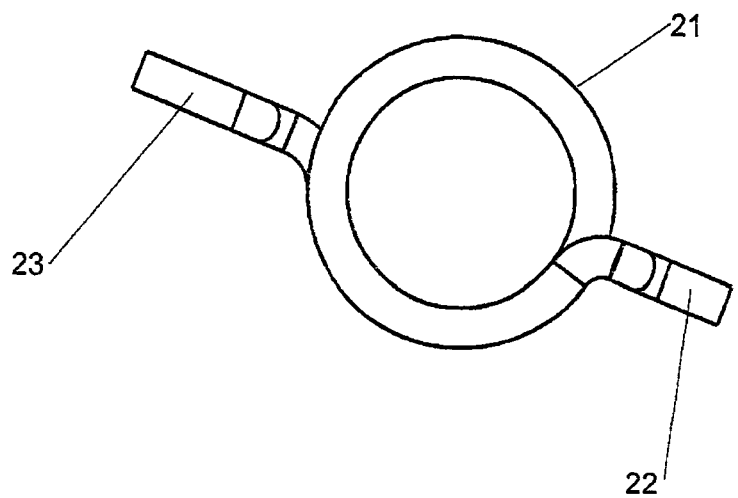
FIG. 6 is the side elevation view of the torsion spring illustrated in FIG. 5.
Figure 7:
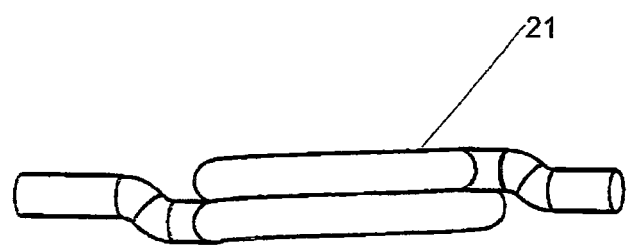
FIG. 7 is an underside view of the spring shown in FIG. 6.

FIG. 6 shows the configuration of the dual stem torsion spring 21 utilised in the solution illustrated in FIG. 5. FIG. 7 shows an underside view of the dual stem spring 21 according to FIG. 6, the drawing also showing the two stems 22, 23 of the dual stem torsion spring 21.

Figure 8:
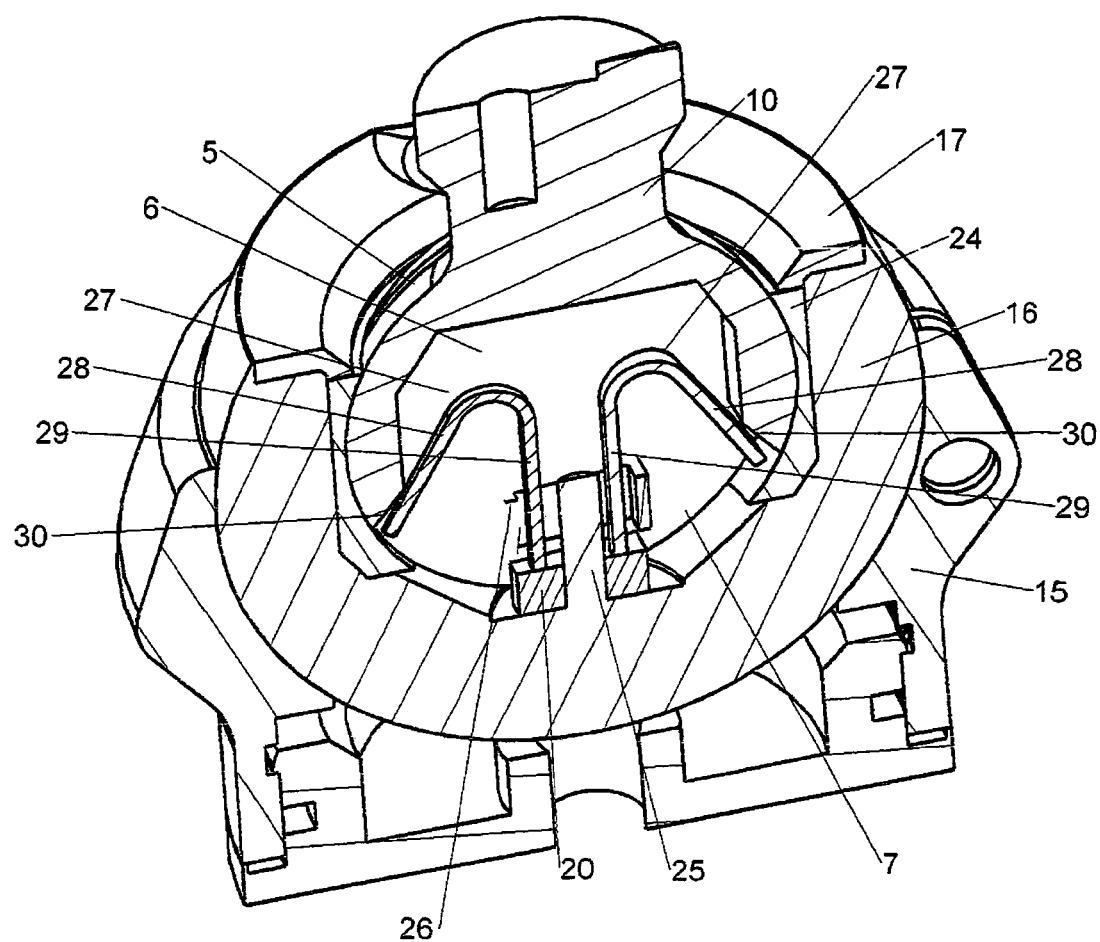
FIG. 8 is a sectional view of another embodiment of the spring mechanism according to the invention.

FIG. 8 shows the sectional view of another possible embodiment of the spring mechanism according to the invention. The drawing shows the outer housing 15 of the ball and socket mounting device 1, with the outer ball shell 16, provided with a guide member 25, being situated therein, and also shows the inner ball 5 inserted into the outer ball shell 16, a socket 24 encompassing the inner ball 5, and the cap 17 adapted for covering the top of the outer ball shell 16.

The height of the guide member 25 is set corresponding to the dimensions of the tensioning springs 27, i.e. to the length of the stems 29 thereof, in order that the stems 29 can be sufficiently supported against the guide member 25.

The lower part of the guide member 25 is encompassed by a slide with bore 20 that is adapted for sliding along the side walls of the longitudinal cavity 7 formed inside the inner ball 5, i.e., along the mounting faces 36, 37 of the longitudinal cavity 7.

The first stems 28 of the flat springs 27 symmetrically arranged in the inner cavity 6 are tensioned against support faces 30 formed in the inner cavity 6, while the second stems 29 of the flat springs 27 are tensioned against the guide member 25, the stems being secured by encompassing the guide member 25 together with the stems 29 of the flat springs 27 in a securing member 26.

Figure 9:
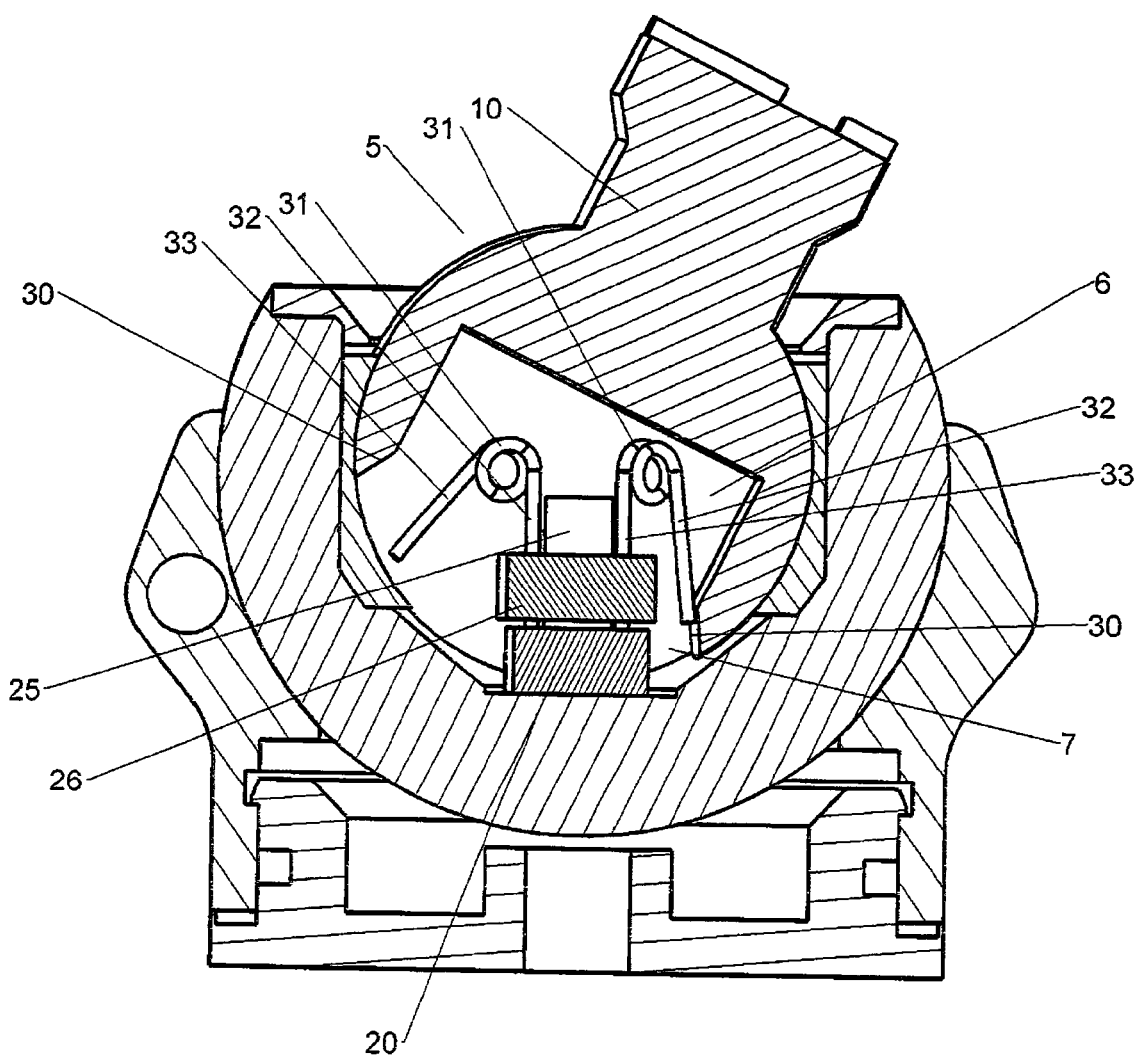
FIG. 9 shows a sectional view of a further preferred embodiment of the spring mechanism according to the invention, with the inner ball being rotated.

FIG. 9 shows the sectional view of a further possible embodiment of the spring mechanism according to the invention, with the inner ball 5 being rotated. The drawing clearly shows the outer housing 15 of the ball and socket mounting device 1, with the outer ball shell 16, provided with a longer guide member 25, being situated therein, and also shows the inner ball 5 inserted the outer ball shell 16, a socket 24 encompassing the inner ball 5, and the cap 17 adapted for covering the top of the outer ball shell 16.

The lower part of the guide member 25 is encompassed by a slide with bore 20 that is adapted for sliding along the side walls of the longitudinal cavity 7 formed inside the inner ball 5, i.e., along the mounting faces 36, 37 of the longitudinal cavity 7.

As shown in the drawing, the inner ball 5 has been rotated in the direction indicated by the arrow. In this case, the stems 32 of the tensioning springs 31 symmetrically arranged in the inner cavity 6 are tensioned against the guide member 25. The positioning of the stems 32 is facilitated by the securing member 26. The stem 33 of the tensioning spring 31 facing the direction of rotation is tensioned against the support face 30 formed in the inner cavity 6, while the stem 33 of the other tensioning spring 31, facing opposite the direction of rotation, hangs freely inside the inner cavity 6, having become distanced from the support face 30.

In this latter case, upon the rotation or sudden tilting of the inner ball 5 the stem 33 of the tensioning spring 31 facing the direction of tilting is tensioned against the support face 30, and the spring force thus produced restricts the further rotation and tilting of the inner ball 5.

Figure 10:
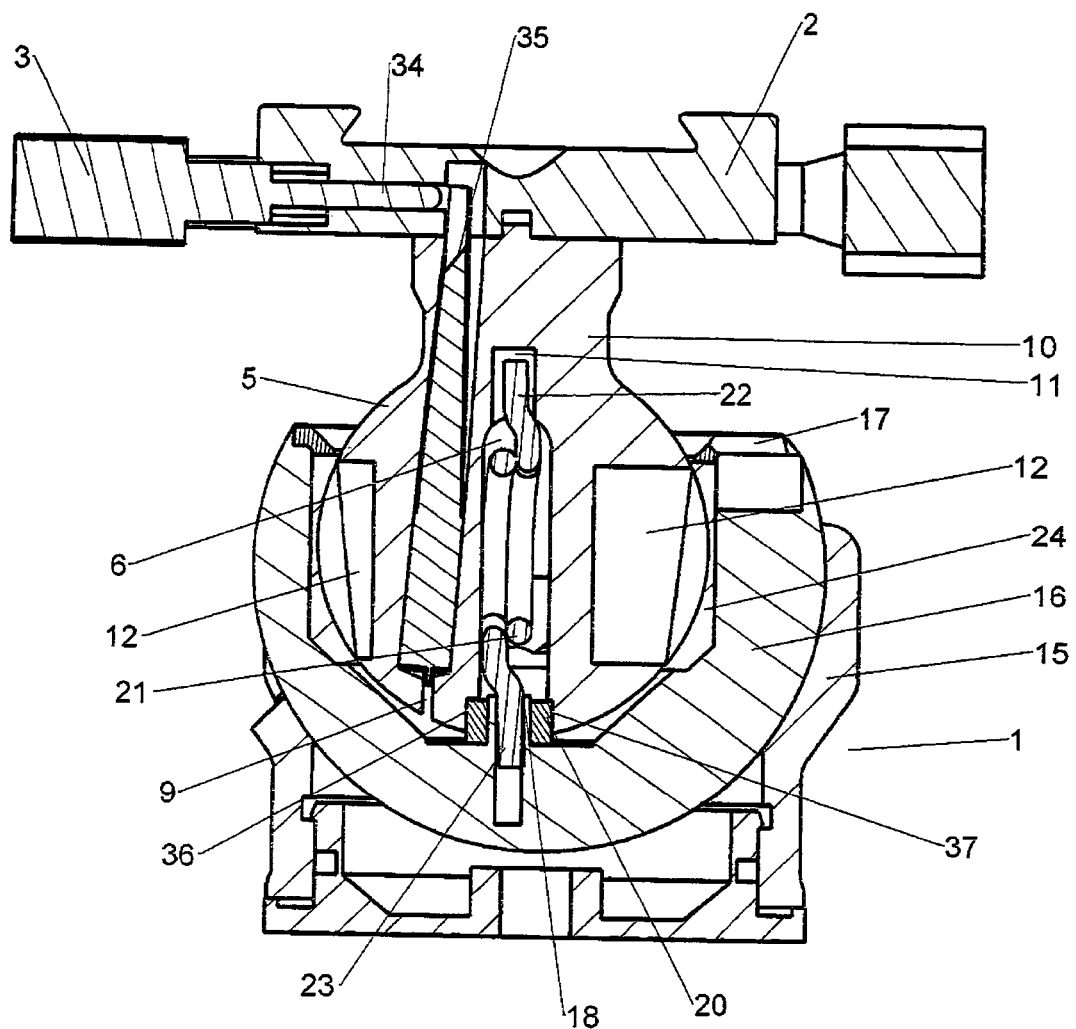
FIG. 10 is the sectional view the anti-tilt spring mechanism and tension mounting mechanism according to a invention, applied for a ball and socket mounting device.

FIG. 10 shows the sectional view of the anti-tilt spring mechanism and tension mounting mechanism according to the invention, applied for a ball and socket mounting device. The drawing shows the outer housing 15 of the ball and socket mounting device 1, with the outer ball shell 16, provided with a guide member 18, being situated therein, and also shows the inner ball 5 inserted in the outer ball shell 16, a socket 24 encompassing the inner ball 5, and the cap 17 adapted for covering the top of the outer ball shell 16. The guide member 18 is encompassed by a slide with bore 20 that is adapted for sliding along the mounting faces 36, 37 of the longitudinal cavity 7 formed inside the inner ball 5.

The stem 23 of a dual stem spring 21 disposed in the inner cavity 6 is secured in a bore 19 formed in the guide member 18, while the other stem 22 of the dual stem spring 21 is secured in the bore 11 formed in the neck portion 10 of the inner ball 5.

In the drawing there can also be seen a tensioning bar 35 that is provided with a positioning pin 38 and is inserted into a tensioning bore 8 having a length H. The upper, narrower part of the tensioning bar 35 extends over the neck portion 10 of the inner ball 5, and is in contact with the stem 34 of the adjustment screw 3 of the mounting disc 2. It can be clearly seen that upon screwing in the adjustment screw 3 the stem 34 thereof exerts a pressure on the narrow upper part of the tensioning bar 35, which results in that the bottom portion of the tensioning bar 35 exerts pressure on the ball section 14, pushing it outward, and thereby the lower part of the inner ball 5 is slightly expanded and becomes stuck in the outer ball shell 16.

Figure 11:
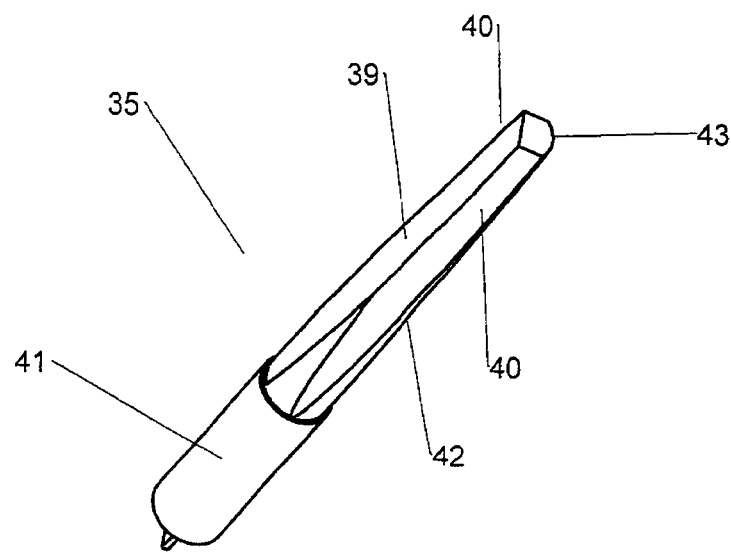
FIG. 11 shows a perspective view of a possible embodiment of the tensioning bar of the mechanism illustrated in FIG. 10.
Figure 12:
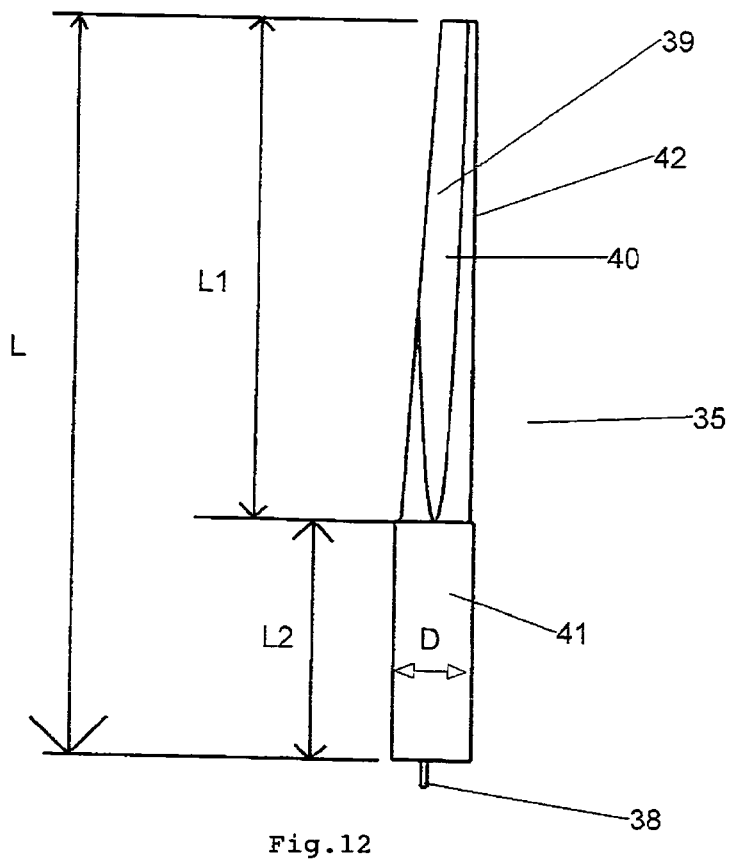
FIG. 12 is the side elevation view of the tensioning bar shown in FIG. 11.

FIG. 11 shows a possible embodiment of the tensioning bar 35. FIG. 12 shows the side elevation view of the tensioning bar shown in FIG. 11. The drawing shows the tensioning bar 35 with its truncated portion 42 having a length L1, and its cylindrical portion having a length L2. The positioning pin 38 of the tensioning bar 35 can also be seen.

In the drawing there can also be clearly seen that the truncated portion 42 is bounded by a tensioning face 39 and two truncated surfaces 40.

Figure 13:
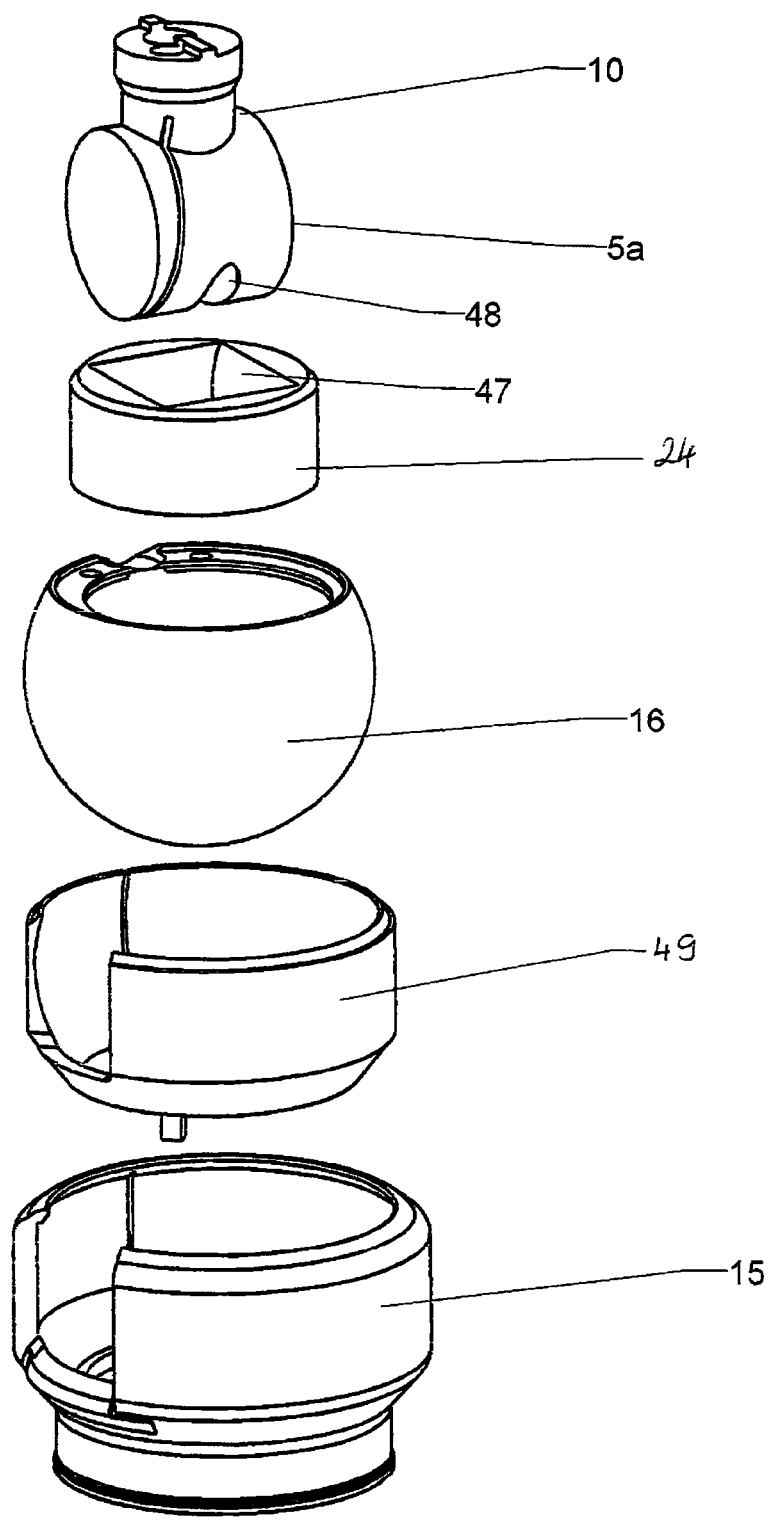
FIG. 13 is an exploded view of another embodiment of the ball and socket part of the ball and socket device according to the invention.

FIG. 13 is an exploded view of another embodiment of the ball and socket mounting device 1 according to the invention.

A tripod—not shown here—is connected to the underside of the lower outer housing 15, while the outer ball shell 16 is arranged in the outer ball shell 15, with a socket 49 and a fastening ring adapted for securing the socket 49 being situated between the outer ball shell 16 and the outer housing 15. The outer ball shell 16 receives a socket 24 and the inner member 5a. The inner member 5a is a cylindrical element situated in the aperture 47 of the socket 24, with an indentation 48 being formed on its upper part at the side opposite the neck portion 10.

Figure 14:
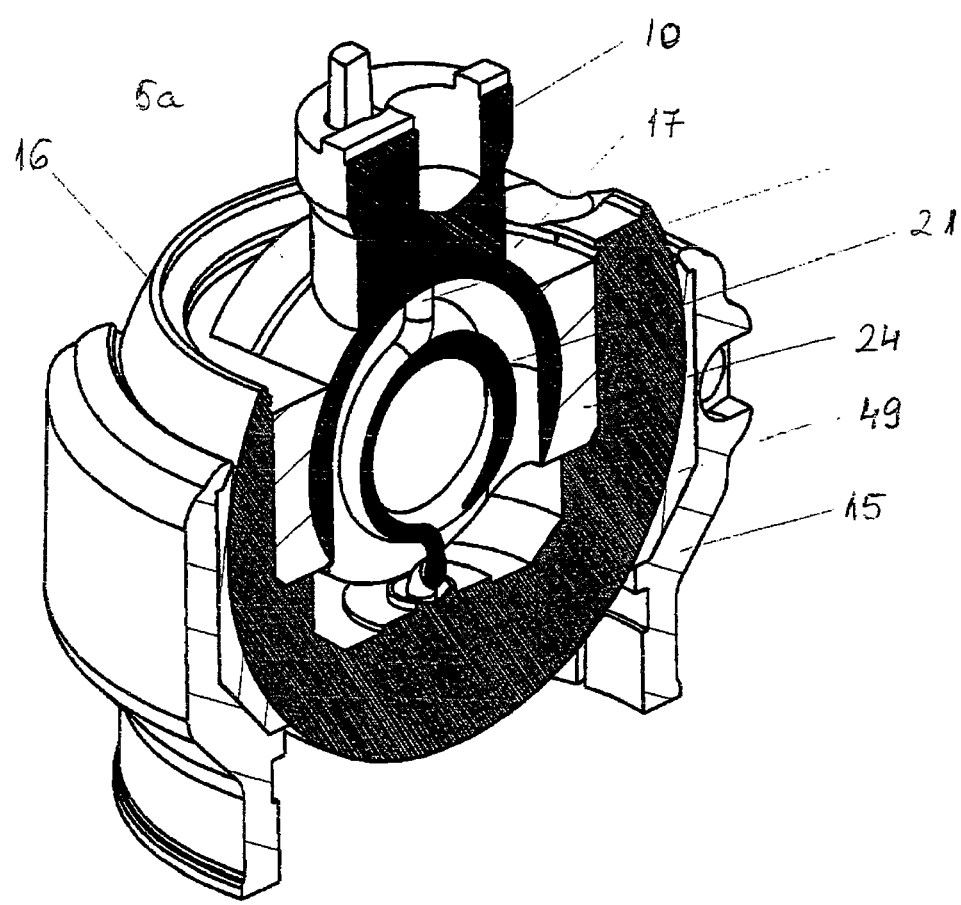
FIG. 14 shows a sectional view of the ball and socket device according to FIG. 13, showing the torsion spring of FIG. 6.

The stem 22 of the dual stem spring 21, disposed inside the ball and socket device, is received in the indentation 48 (see FIG. 14).

Figure 15:
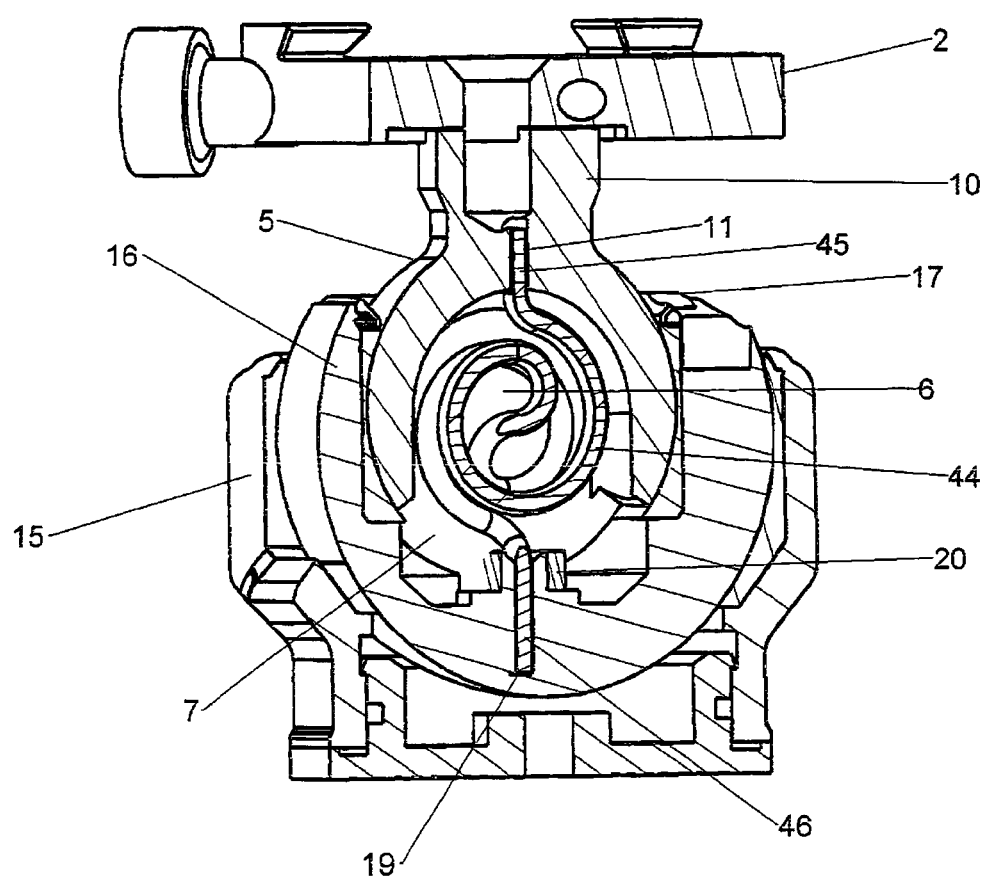
FIG. 15 is a sectional view of a further preferred embodiment of the spring mechanism according to the invention.

FIG. 15 shows a sectional view of a further embodiment of the anti-tilt spring mechanism and tension mounting mechanism according to the invention.

There can be clearly seen in the drawing the outer housing 15 of the ball and socket mounting device 1, with the outer ball shell 16, provided with a guide member 18, being situated therein, and also the inner ball 5 inserted in the outer ball shell 16, a socket 24 encompassing the inner ball 5, and the cap 17 adapted for covering the outer ball shell 16. The slide with bore 20 is placed on the guide member 18 by means of the bore.

A specially configured dual stem spring 44 is disposed in the inner cavity 16 of the inner ball 5, with the first and second stem 45, 46 of the spring being secured, respectively, in a bore 11 formed in the neck portion 10 of the inner ball 5, and in a bore 19 formed in the guide member 18. The bore 19 formed in the guide member 18 for receiving the stem 46 of the spring 44 is expediently deeper than the length of the guide member 18, the bore 19 thereby extending into the outer ball shell 16, and the stem 46 of the spring 44 being secured against the outer ball shell 16.

Figure 16:
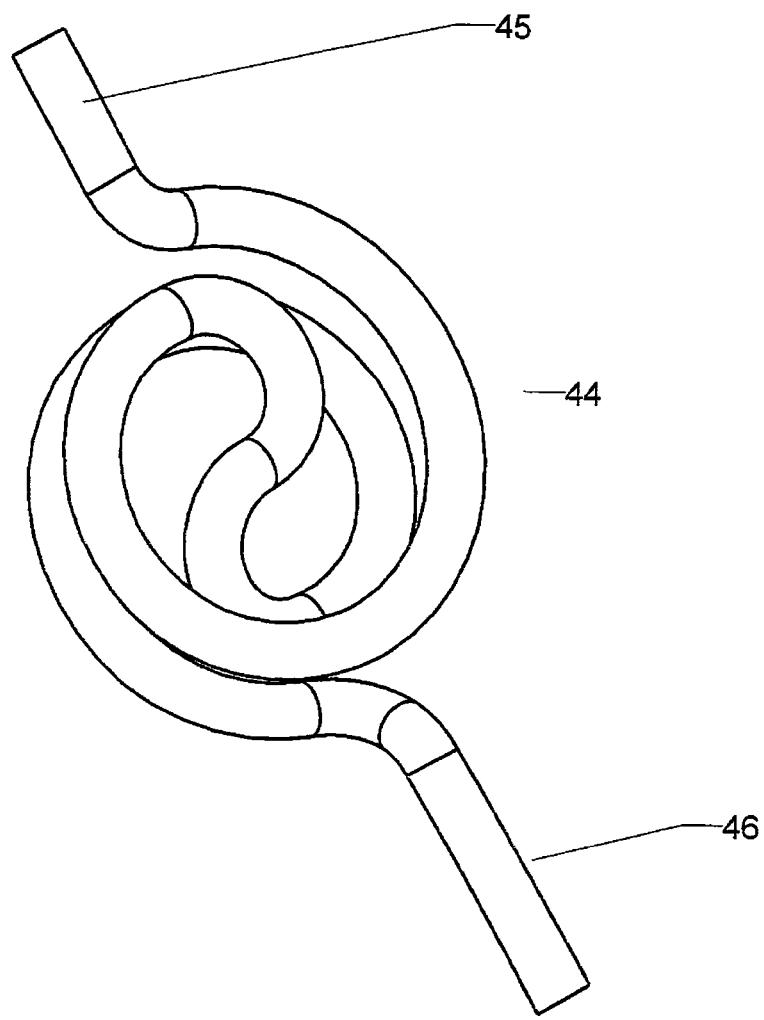
FIG. 16 is a top plan view showing the spring of the spring mechanism of FIG. 15.
Figure 17:
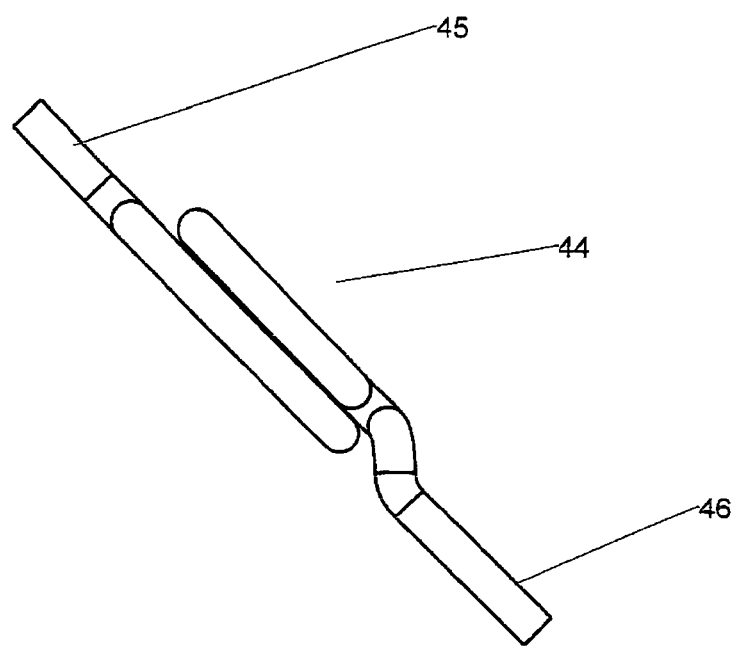
FIG. 17 is the side elevation view of the spring shown in FIG. 16.

FIGS. 16, 17, respectively, show the top plan and side elevation views of the spring 44 of the anti-tilt and tension mounting mechanism shown in FIG. 15. The spring 44 is a multiply folded torsion spring, with the stems 45, 46 thereof being secured to the mechanism in a manner explained in relation to FIG. 15.

Figure 18:
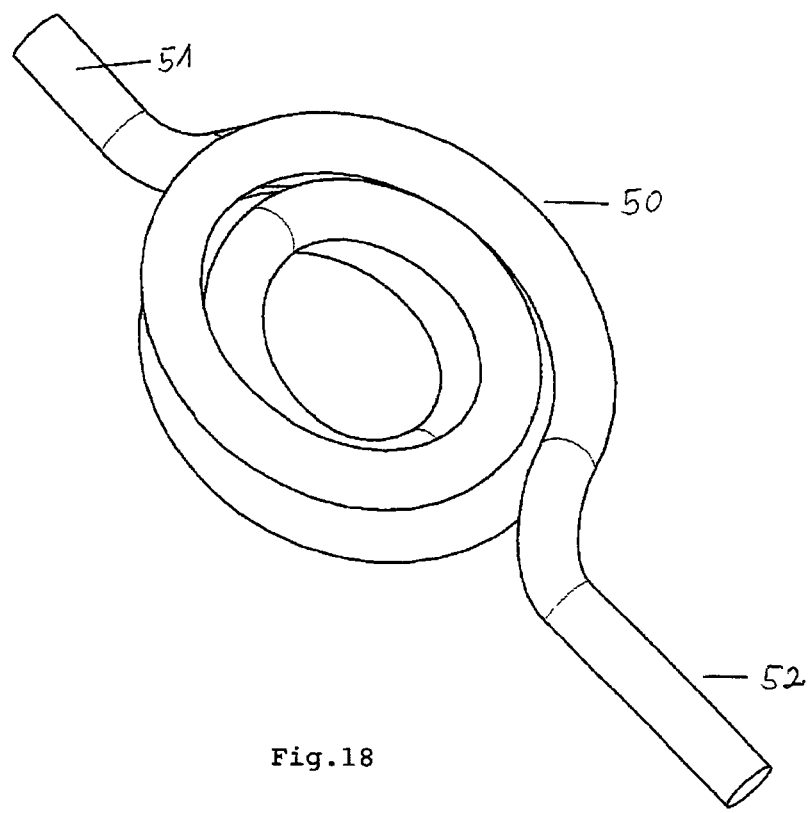
FIG. 18 is a top plan view of a further preferred embodiment of the spring of the spring mechanism of FIG. 16.
Figure 19:
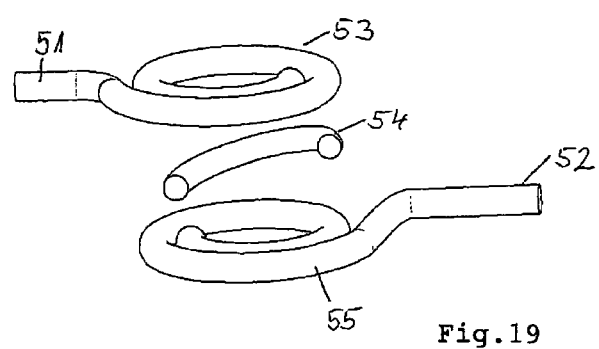
FIG. 19 is an exploded view of the spring of FIG. 18.
Figure 20:
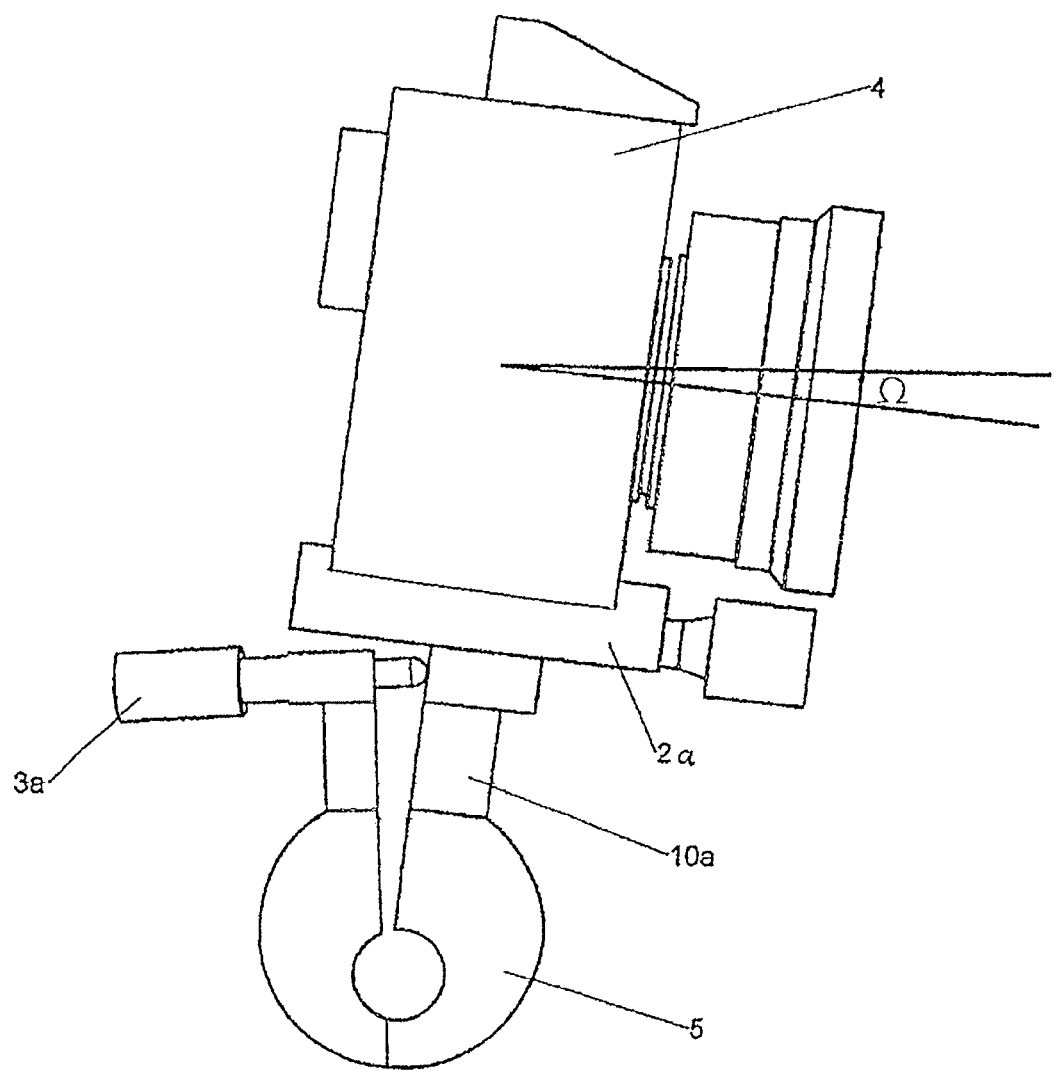
FIG. 20. is a drawing illustrating the disadvantages of a prior art device.

FIGS. 18, 19 respectively show the top plan and exploded view of the spring 50, which is an other embodiment of the spring of the spring mechanism of FIG. 15. This spring 50 is a multiply folded torsion spring with stems 51, 52 thereof being secured to the mechanism in a manner explained in relation with FIG. 15.

The parts 53, 54, 55 of spring 50 are shown in FIG. 19.

With an expedient preferred embodiment of the invention (see FIG. 4) the outer ball shell 16 arranged with the guide member 18 is inserted in the outer housing 15, and the inner ball 5 is then inserted into the outer ball shell 16. The dual stem spring 21 is arranged in the inner cavity 6 of the inner ball 5 such that the stem 23 of a dual stem spring 21 is secured in a bore 19 formed in the guide member 18, while the other stem 22 of the dual stem spring 21 is secured in the bore 11 formed in the neck portion 10 of the inner ball 5.

A slide with bore 20 is arranged to encompass the guide member 18, the slide with bore 20 being is positioned for sliding along the mounting faces 36, 37 of the longitudinal cavity 7 formed inside the inner ball 5.

A tensioning bore 8 with a diameter D and an axis t1 is formed in the inner ball 5, extending from the neck portion 10 of the inner ball 5 near the bottom of the inner ball 5.

Also in the inner ball 5 there is disposed a slit 9 starting from the bottom portion of the inner ball 5, extending to the beginning of the neck portion 10 of the inner ball 5. The slit 9 divides the inner ball 5 into two spatial regions, a larger ball section 13 and a smaller ball section 14.

The geometric configuration of the slit 9 is envisioned such that the slit 9 encompasses the axis t1 of the tensioning bore 8. Also, a socket 24 and a cap 17 are inserted between the inner ball 5 and the outer ball shell 16.

A tensioning bar 35 with a length L is arranged for operating the mounting mechanism according to the invention. The tensioning bar 35 is made from a cylinder having a diameter D, with a positioning pin 38 being disposed at the end of its cylindrical portion 41 having a length L2. The truncated portion 42, with a length L1, of the tensioning bar 35 is formed by the tensioning face 39 and two truncated surfaces 40 machined to be perpendicular to the face 39.

For the tensioning bore 8, having a length H, and the tensioning bar 35 having a length L the inequality L>H holds.

The tensioning bar 35 is inserted in the tensioning bore 8 such that the positioning pin 38 thereof extends into the slit 9, and the uppermost part of the truncated portion 42 of the tensioning bar 35 protrudes from the tensioning bore 8, the stem 34 of the adjustment screw 3 coming into contact with the arcuate face 43 of the truncated portion 42. The arcuate face 43 may optionally be arranged to be flat. The proportion between the truncated portion 42 having a length L1 and the cylindrical portion L2 of the tensioning bar 35 is: L1:L2=4: 1-L1:L2=3:1 (see FIG. 2).

For the solution according to the invention it is important that the axis t1 of the tensioning bore 8 should be situated in the slit 9 along the lower ⅓-¼ part of the slit 9, to ensure that the lower cylindrical portion 41 of the tensioning bar 35 inserted in the tensioning bore 8 can push outward the ball sections 13, 14 of the inner ball 5 without getting stuck.

In an expedient embodiment of the solution according to the invention the optical device, by way of example, the camera 4, is mounted on the mounting disc 2 attached to the neck portion 10 of the inner ball 5 of the ball and socket mounting device 1 in a known manner. For positioning the camera 4 at the desired angle, first the upper truncated (flat) face of the outer ball shell 16 is levelled in a known manner, by way of example by means of a spirit level. Further positioning of the camera 4 is carried out subsequently, i.e. by rotating the inner ball 5 horizontally in the outer ball shell 16 about the vertical axis only, as rotation in other directions is blocked because the slide with bore 20, positioned in the mounting faces 36, 37 of the longitudinal cavity 7 of the inner ball 5, is secured such that it encompasses the guide member 18 of the outer ball shell 16. Subsequently, further positioning/orienting can be carried out by rotating, to a desired extent, the inner ball 5 along a plane defined by the longitudinal cavity 7. The slide with bore 20, positioned in the mounting faces 36, 37 of the inner ball 5 such that it encompasses the guide member 18 of the outer ball shell 16, then begins to slide inside the longitudinal cavity 7 of the inner ball 5.

During this orienting operation, however, the body—by way of example, a camera with a large lens—mounted on the mounting disc 2, could tilt the inner ball 5 to a larger extent due to its weight and the position of its centre of gravity in case it is not supported sufficiently by the person performing the orienting. However, at this point the anti-tilt spring mechanism according to the invention is activated, and the dual stem torsion spring 21 inserted in the inner cavity 6 of the inner ball 5 prevents excessive tilting, i.e. the spring force counterbalances the tilting torque.

Once the given body or camera has attained the desired position/orientation, the position/orientation is locked by turning the adjustment screw 3 inward, which causes the stem 34 of the adjustment screw 3 to exert pressure on the arcuate face 43 of the truncated portion 42 of the tensioning bar 35 situated in the tensioning bore 8. Because the truncated portion 42 has lower cross section area than the tensioning bore 8, it becomes displaced inside the tensioning bore 8. Thereby, acting as a first class lever with its fulcrum being the interconnection point of the cylindrical portion 41 and the truncated portion 42, it causes the opposite-direction displacement of the cylindrical portion 41, which in turn exerts a pressure on the smaller ball section 14 of the inner ball 5, and pushes the ball section 14 further from the ball section 13 along the slit 9. Thereby, the diameter of the inner ball 5 increases and the ball gets stuck inside the outer ball shell 16.

In a possible embodiment of the invention the tensioning springs 31 may be disposed in the inner cavity 6 of the inner ball 5 such that the first stems 32 of the tensioning springs 31 are in contact with the guide member 25. The second stems 33, in turn, are in contact with the support face 30, the positioning of the tensioning spring 31 being provided such that the width of the inner cavity 6 is substantially the same as the width of the tensioning springs 31, and thus the springs cannot be displaced from their correct position.

In a further possible embodiment of the invention the tensioning springs 31 may be disposed in the inner cavity 6 of the inner ball 5 such that the second stems 33 of the tensioning springs 31 are secured against the support face 30, while their first stems 32 can come in contact with the guide member 25, and can also become distanced from it. Or, alternatively, both stems 32, 33 of each tensioning spring 31 are secured against the guide member 25 and the support face 30.

The diameter D is preferably approximately 6 mm.

The cross section area of the slit 9 is: 1-1.5 mm, preferably 1.2 mm.

Since the tilting force increases with the tilt angle as the camera is tilted forward, a proportionally increasing counterforce is needed to counterbalance it. An appropriately arranged torsion spring, having a spring force increasing in proportion to its rotation, fulfils this requirement.

The solution according to the invention has the advantages that the spring mechanism thereof allows for preventing the inner ball and the body (by way of example, camera) connected thereto from being tilted when the inner ball of the ball and socket mounting device is displaced from balance as it is rotated in the vertical plane, and that it provides for fixing the inner ball in a given position in such a manner that the optical axis of the body connected to the ball and socket mounting device is not rotated even to the slightest extent.

LIST OF REFERENCE NUMERALS

1—ball and socket mounting device
2—mounting disc
3—adjustment screw
3a—tensioning screw
4—camera
5—inner ball
5a—inner member
6—inner cavity
7—longitudinal cavity
8—tensioning bore
10—neck portion
10a—neck portion
11—bore
12—recess
13—ball section
14—ball section
15—outer housing
16—outer ball shell
17—cap
18—guide member
19—bore
20—slide with bore
21—dual stem spring
22—stem
23—stem
24—socket
25—guide member
26—securing member
27—flat spring
28—stem
29—stem
30—support face
31—tensioning spring
32—stem
33—stem
34—stem
35—tensioning bar
36—mounting face
37—mounting face
38—positioning pin
39—tensioning face
40—truncated surface
41—cylindrical portion
42—truncated portion
43—arcuate face
44—spring
45—spring stem
46—spring stem
47—aperture
48—indentation
49—socket
50—spring
51—spring stem
52—spring stem
53—part of spring
54—part of spring
55—part of spring
L—length
L1—length
L2—length
H—length
t1—axis
D—diameter
α—angle of inclination
P—pivot point
FG—tilting force
G—centre of gravity

The invention claimed is:

1. Anti-tilt spring mechanism and tension mounting mechanism for a ball and socket mounting device (1), comprising an outer housing (15), an outer ball shell (16) disposed in the outer housing and provided with an upstanding guide member (18) unitary with the outer ball shell which together with the outer ball shell defines a bore (19) in a bottom portion of the outer ball shell, a socket (24) within the outer ball shell, a cap (17) covering a top portion of the outer ball shell, an inner ball (5) received in the socket, the inner ball having a neck portion (10), defining an inner cavity (6), a longitudinal cavity (7) extends from the bottom of the inner ball and connecting to the inner cavity wherein the longitudinal cavity is bordered by two opposed mounting faces (36, 37) defined by bottom of the inner ball, furthermore, the inner ball comprising a tensioning bore (8) extending from the top of the inner ball and a slit (9) within the tensioning bore for receiving a positioning pin (38) of a tensioning bar (35), and a slide (20) inside of the inner ball having a bore encompassing the guide member, and a mounting disc (2) provided with an adjustment screw (3) and attached to the neck portion (10) of the inner ball (5), the slide being situated in the longitudinal cavity and slidably engaged with the opposed mounting faces, further characterised in that at least one elastic body is in the inner cavity (6) of the inner ball (5) and is in contact with or attached to the guide member (18) of the outer ball shell (16) and an interior surface of the inner ball (5), such that the rotation of the inner ball (5) is counteracted by the torque produced by the force arising from a deformation of the elastic body effected by the rotation of the inner ball (5).

2. The anti-tilt spring mechanism and tension mounting mechanism of claim 1 further characterised in that the elastic body is a dual stem torsion spring (21, 44) mounted inside the inner cavity (6) of the inner ball (5) such that a first stem (23, 46) of the dual stem torsion spring (21, 44) is secured in the bore (19) of the guide member (18), and a second stem of the dual stem torsion spring is secured in a bore (11) formed in the neck portion (10), a spring force of the dual stem torsion spring thereby counterbalancing the tilting force produced by a weight situated on the mounting disc (2) secured to the inner ball (5), that the slit (9) starts at the bottom portion of the inner ball (5) and extends to the neck portion (10) of the inner ball (5), the slit (9) dividing the inner ball (5) into two spatial regions, a larger ball section (13) and a smaller ball section (14), and that the tensioning bore (8) has a diameter D and an axis t1, extends from the neck portion (10) near the bottom of the inner ball (5), is formed such that the axis t1 of the tensioning bore (8) extends along the slit (9), and a tensioning bar (35) is in the tensioning bore (8) in such a manner that an upper arcuate face (43) of the tensioning bar contacts the adjustment screw (3) at a stem portion (34) thereof.

3. The anti-tilt spring mechanism according to claim 2, characterised in that the tensioning bar (35) having a length L comprises a cylindrical portion (41) having a length L2 and a diameter D, and a truncated portion (42) having a length L1, with the positioning pin (38) being disposed on the cylindrical portion (41), and with the truncated portion (42) having a tensioning face (39), two truncated surfaces (40) set perpendicular to the tensioning face (39), and an arcuate face (43), where L1:L2=4:1-L1:L2=3:1.

4. The anti-tilt spring mechanism according to claim 2, characterised in that length of the tensioning bar (35) is longer than the tensioning bore (8).

5. The anti-tilt spring mechanism according to claim 2, characterised in that the axis t1 of the tensioning bore (8) lies inside the slit (9) along the lower ⅓-¼ of the length thereof.

6. The anti-tilt spring mechanism according to claim 1, characterised in that weight reduction recesses (12) are formed in the inner ball (5).

7. The anti-tilt spring mechanism according to claim 1, characterised in that the inner ball (5) comprises an inner member (5a) configured as horizontal-axis body of revolution.

8. The anti-tilt spring mechanism according to claim 1, characterised in that a socket (49), secured with an attachment element, is disposed between the outer housing and the outer ball shell.

\* \* \* \* \*